US012492562B2

(12) United States Patent
Drevet et al.

(10) Patent No.: US 12,492,562 B2
(45) Date of Patent: Dec. 9, 2025

(54) ACOUSTIC DECORATIVE ARTICLE WITH MULTILAYERED POROSITY BASE

(71) Applicant: Shaw Industries Group, Inc., Dalton, GA (US)

(72) Inventors: Anthony Drevet, Chattanooga, TN (US); Shawn Liao, Taichung (TW); Jing Ouyang, Shanghai (CN)

(73) Assignee: Shaw Industries Group, Inc., Dalton, GA (US)

( * ) Notice: Subject to any disclaimer, the term of this patent is extended or adjusted under 35 U.S.C. 154(b) by 0 days.

(21) Appl. No.: 18/994,996

(22) PCT Filed: Mar. 27, 2024

(86) PCT No.: PCT/US2024/021611
§ 371 (c)(1),
(2) Date: Jan. 15, 2025

(87) PCT Pub. No.: WO2024/206391
PCT Pub. Date: Oct. 3, 2024

(65) Prior Publication Data
US 2025/0263935 A1  Aug. 21, 2025

Related U.S. Application Data

(60) Provisional application No. 63/601,993, filed on Nov. 22, 2023, provisional application No. 63/454,881, filed on Mar. 27, 2023.

(51) Int. Cl.
*E04F 15/00* (2006.01)
*B32B 3/06* (2006.01)
(Continued)

(52) U.S. Cl.
CPC .......... *E04F 15/02038* (2013.01); *B32B 3/06* (2013.01); *B32B 5/18* (2013.01);
(Continued)

(58) Field of Classification Search
CPC .......... E04F 15/02033; E04F 15/02038; E04F 15/107; E04F 15/102; E04F 15/105;
(Continued)

(56) References Cited

U.S. PATENT DOCUMENTS 8,549,807 B2   10/2013   Meersseman et al.
11,053,695 B2   7/2021   Baert et al.
(Continued)

FOREIGN PATENT DOCUMENTS

DE   102019117426 A1   12/2020

OTHER PUBLICATIONS

Written Opinion of International Searching Authority, PCT Application No. PCT/US2024/021611, dated Mar. 27, 2024.
(Continued)

*Primary Examiner* — Chi Q Nguyen
(74) *Attorney, Agent, or Firm* — Miller & Martin PLLC

(57) ABSTRACT

An improved decorative article that may be used as a decorative flooring panel. The decorative article comprises a laminated structure having a core layer and a top layer. The core layer includes separate upper and lower sections with different compressibility resistances, such that the upper section of the core layer exhibits a lower compressibility resistance than the compressibility resistance of the lower section. In some embodiments, for example, the upper and lower sections of the core layer may be foamed layers having different porosities and densities. In some disclosed embodiments, the top layer above the core layer may comprise a coating, a wear layer, and a décor layer. According to some embodiments, a plurality of holes may extend through the top layer, or through only a portion of the top layer, to further improve acoustic performance of the decorative article.

18 Claims, 11 Drawing Sheets

(51) Int. Cl.
- *B32B 5/18* (2006.01)
- *B32B 5/32* (2006.01)
- *B32B 7/022* (2019.01)
- *E04F 15/02* (2006.01)
- *E04F 15/10* (2006.01)
- *B44F 9/02* (2006.01)
- *B44F 9/04* (2006.01)

(52) U.S. Cl.
CPC ............... *B32B 5/32* (2013.01); *B32B 7/022* (2019.01); *E04F 15/105* (2013.01); *B32B 2266/0214* (2013.01); *B32B 2307/54* (2013.01); *B32B 2307/7376* (2023.05); *B32B 2419/00* (2013.01); *B32B 2451/00* (2013.01); *B44F 9/02* (2013.01); *B44F 9/04* (2013.01); *E04F 2201/0153* (2013.01); *E04F 2201/023* (2013.01); *E04F 2201/042* (2013.01); *E04F 2201/043* (2013.01)

(58) Field of Classification Search
CPC ............... E04F 13/18; E04F 2201/042; E04F 2201/0107; E04F 2201/03; E04F 2201/0552; E04F 2201/023; E04F 2201/0535; E04F 2201/0146; E04F 2201/043; E04F 2201/0547; E04F 2201/0153; E04F 2201/0138; B44C 5/04; E04B 9/045; B32B 7/022; B32B 3/06; B32B 5/18; B32B 2307/7376; B32B 2266/0214; B32B 2307/54; B32B 2419/00; B32B 2451/00; B44F 9/04

See application file for complete search history.

(56) References Cited

U.S. PATENT DOCUMENTS

| | | | |
|---|---|---|---|
| 12,331,529 B2* | 6/2025 | De Rick | E04F 15/107 |
| 2013/0118831 A1 | 5/2013 | Kawai et al. | |
| 2020/0308846 A1* | 10/2020 | Josefsson | E04F 13/076 |
| 2021/0245469 A1 | 8/2021 | Hattori et al. | |
| 2021/0332597 A1 | 10/2021 | Van Vlassenrode et al. | |
| 2022/0213697 A1 | 7/2022 | Van Vlassenrode et al. | |
| 2023/0079984 A1 | 3/2023 | Clement et al. | |
| 2023/0102628 A1* | 3/2023 | Baert | B32B 27/306 52/588.1 |
| 2025/0001738 A1* | 1/2025 | Baert | B32B 5/18 |
| 2025/0019972 A1* | 1/2025 | Baert | E04F 13/0875 |
| 2025/0128492 A1* | 4/2025 | Baert | E04F 15/181 |

OTHER PUBLICATIONS

International Search Report of International Searching Authority, PCT Application No. PCT/US2024/021611, dated Mar. 27, 2024.
Written Opinion of International Searching Authority, PCT Application No. PCT/US2024/049590, dated Dec. 19, 2024.
International Search Report of International Searching Authority, PCT Application No. PCT/US2024/049590, dated Dec. 19, 2024.

* cited by examiner

ACOUSTIC DECORATIVE ARTICLE WITH MULTILAYERED POROSITY BASE

PRIORITY

The present application is a U.S. National Stage Application under 35 U.S.C. § 371 of PCT International Application No. PCT/US2024/021611, filed Mar. 27, 2024, which claims a benefit of priority to U.S. Provisional Application Ser. No. 63/454,881, entitled "Decorative Article With Multilayered Porosity Base," by Anthony Drevet, filed on Mar. 27, 2023, and also claims a benefit of priority to U.S. Provisional Application Ser. No. 63/601,993, entitled "Acoustic PVC Free Decorative Article," by Shawn Liao et al., filed on Nov. 22, 2023, both of which are hereby incorporated by reference in their entireties as though fully set forth herein.

TECHNICAL FIELD

The present disclosure generally relates to decorative articles and, more particularly, relates to a novel decorative article with a multilayered compressibility structure for a base layer and improved acoustics.

BACKGROUND

Traditional decorative articles, such as decorative surface covering articles, are typically composed of hardwood or other materials. Natural wood panels can warp, bend, crack, swell, thermally expand, etc., under various environmental conditions. For this reason, decorative articles formed using more rigid and environmentally-stable composite materials have become more prevalent in both residential and commercial installations.

SUMMARY OF THE INVENTION

Decorative articles such as decorative flooring covering panels are typically formed as a laminated structure including a rigid base layer and a decorative layer (décor layer) often designed to simulate the appearance of natural hardwood or stone. The rigid base layer, such as comprising wood plastic composite (WPC), stone plastic composite (SPC), expanded plastic composite (EPC), or rigid composite board (RCB) materials, can have a locking system that is formed (for example milled) directly into the rigid base layer and is strong enough to ensure long-term locking between adjacent decorative articles of similar construction. In contrast, a flexible base layer, such as used in many luxury vinyl tiles (LVT), does not have such a locking system formed in the base layer because the locking system would be too weak to securely interlock adjacent decorative articles due to the material flexibility. As used herein, a rigid base layer may be any base layer, including semi-rigid base layers, that can support a locking system formed in the base layer consistent with the exemplary embodiments disclosed herein.

Conventional rigid base layers may be formed from various types of thermoplastics, such as polyvinyl chloride (PVC), polyurethane (PU), polyethylene (PE), polypropylene (PP), polyethylene terephthalate (PET), and so forth. Natural or synthetic fibers, powders, and/or fillers may be added to the thermoplastic matrix material (binder) to form a composite for the rigid base layer. For example, wood plastic composites may comprise a thermoplastic binder combined with wood fibers or other natural or synthetic fillers, fibers, and/or powders. Stone plastic composites may comprise a thermoplastic binder combined with limestone powder or other mineral powders or fillers, for example, where the weight percentage of the filler is greater than the weight percentage of the thermoplastic.

To form a decorative flooring panel, a décor layer is positioned above the rigid base layer within the laminated structure. The décor layer may comprise a pattern or image that visually resembles the appearance of natural wood or stone (or any other appropriate and desired appearances). A protective layer may be formed over the décor layer to protect its pattern or image from wear, e.g., due to foot traffic. The laminated structure may comprise a layer below the rigid base layer, e.g., for cushioning or stability.

Decorative flooring panels may be installed using various types of fastening or locking systems for interconnecting adjacent panels. For example, the rigid base layer of a decorative flooring panel may be designed to include a protruding tongue portion along one of its outer edges and a grooved portion along an opposite edge. In the installation process, the tongue along an edge of a first flooring panel may be shaped to fit within the groove of an edge of an adjacent panel, thereby locking the two panels together against both vertical and horizontal movements on the floor installation. This process of interlocking adjacent flooring panels may be repeated to completely cover a large flooring area.

Decorative flooring panels must comprise a sufficiently dense and hard rigid base layer to create a strong inter-panel locking system and also provide resistance to bending, warping, denting, cracking, etc., under normal loads. Because of the required hardness and rigidity of the base layer in conventional decorative flooring panels, they can be excessively noisy and/or uncomfortable to walk on.

A need exists for improved decorative articles, e.g., improved decorative flooring panels, that still provide the required density and hardness necessary to avoid harmful bending, warping, denting, cracking, etc. of the panels or damage to their locking system, while at the same time improving the panels' acoustics and underfoot comfort (which also may include warmth) when users walk on the installed flooring panels. As used herein, acoustics can refer to an in-room generated sound or a reflected sound. In addition, in some examples, acoustics can refer to room-to-room transmission of sound (e.g., room above to room below or adjacent rooms on same level).

The disclosed embodiments of the invention provide improved decorative articles, such as decorative flooring panels, having a laminated structure with at least a top layer and a base layer. In some disclosed embodiments, the decorative articles also may include a resilient soft layer underneath the base layer, which can function as a non-skid layer for loose-laid flooring panels. In some embodiments, this resilient soft layer may be a separate layer with a specific texture and composition that is different from the base layer. For example, the resilient soft layer may comprise an underlayment material that is adhered or bonded on or below a bottom surface of the base layer and may comprise rubber, LVT, or another dense material having good acoustic performance, e.g., compared with cork, irradiated cross-linked PE (IXPE), or EVA foam. In some examples, the resilient soft layer may comprise a tacky feature or suction features (e.g., including micro or nano suction features) at the bottom of the resilient soft layer. In other embodiments, the resilient soft layer may be integrally formed with the base layer or, in some embodiments, formed as a pattern on a bottom surface of the base layer. In some disclosed embodiments, the top layer, positioned above the base layer, may comprise a coating, a wear layer, and a décor layer.

Unlike rigid base layers in conventional decorative flooring panels, the base layer in the disclosed embodiments is preferably designed to have separate upper and lower sections, such that the upper section has a lower compressibility resistance than the lower section. In some cases, the lower section of the base layer may have a compression resistance around two times greater than the upper section's.

For example, to measure the compressibility of each section of a multilayered base layer in decorative flooring panels formed in accordance with the disclosed embodiments, the inventors used a modified version of the ASTM 1914 test method (standard indentation test). In such tests, the inventors changed the indenter plate and used the 28 millimeter (mm) round indenter from ASTM 970 (test for recovery after static load); the inventors also reduced the time under pressure to 30 seconds and measured the compression rate while under weight at 30 seconds. For this test, all pre-attached pads were removed since the inventors focused on the surface properties of the decorative flooring panels only. To measure the sound reduction, the inventors recorded and measured the sound of a metallic ball dropping from a 12 inch height onto the panel.

The inventors found that the upper section compressibility of the decorative flooring panels being tested correlates to a footstep sound reduction, and the compressibility of the lower section of the base layer correlates to a dent resistance of the decorative flooring panel products. The higher the compressibility of the upper section of the base layer, the lower the footstep sounds. But for a flooring application, dent resistance (or indentation resistance) of the decorative flooring panels is also preferred. If the compression rate of a decorative flooring panel is too high, it may result in a dent. Further, the lower the compressibility of the lower section of the base layer, the higher is the click strength of the decorative flooring panel (e.g., as measured per ISO 24334).

According to the inventors' studies, traditional resilient rigid flooring panels may have a core upper layer compressibility (e.g., measured as a compression percentage or "compression rate" or "compressibility rate") between 2% and 4%. In contrast, some of the decorative flooring panels formed in accordance with the disclosed embodiments have an upper section compressibility rate that is greater, for example, having an upper section compressibility rate between around 5% to around 30%. The inventors realized that an upper-section compressibility rate above 10% may result in the dent resistance dropping to a level that might not be acceptable for some flooring applications. However, an upper section compressibility rate above 10% and up to 30% is not outside of the scope of the present disclosure for some flooring applications. The inventors' studies showed that a compression rate between around 5% to around 10% for the upper section can be a good compromise: in some cases, this range of upper section compressibility can bring significant sound reduction but keep an acceptable dent resistance. For the core lower section compressibility, traditional resilient rigid flooring panels may have a compressibility of less than 5%. Some of the inventors' test samples with a base-layer lower section compressibility rate of around 4% and a base-layer upper section compressibility rate of around 8% provide an exemplary solution for improved decorative flooring panels having sufficient noise reduction and dent resistance for the current market need. The inventors also made other test samples, for example, having a base-layer lower section compressibility rate of around 2% and an upper section compressibility rate of around 5%. Based on the inventors' studies, a ratio of upper-section compressibility to lower-section compressibility around two (2) seemed to provide a good compromise for quality, sound reduction, and cost. In some examples, the ratio of upper section compressibility to lower section compressibility is at least 1.5, or at least 1.6, or at least 1.7, or at least 1.8, or at least 1.9, or at least 2 for a good balance between desired or acceptable indentation resistance and sound/noise reduction.

The inventors' studies also found that the amount of indentation of decorative flooring panels formed in accordance with the disclosed embodiments may be less than 25% as measured according to ASTM F1914. In some embodiments, for example, the amount of indentation measured by ASTM F1914 may be less than 20%, less than 15%, less than 10%, or less than 5%. Further, in some disclosed embodiments, the amount of indentation of the decorative flooring panels, as measured by ASTM F1914, may be between around 1% to around 25%.

An inter-panel locking system is formed only in the less-compressible lower section of the base layer, such as by milling a tongue and groove or other click-lock system (or any other auditory cue generating system to indicate locking) along its edges. Advantageously, the lower section of the base layer may be sufficiently rigid and hard to support a strong inter-panel locking system and provide resistance to bending, warping, denting, cracking, etc., while the more-compressible upper section may provide for softer, more comfortable, and improved acoustics (e.g., less noisy footsteps) than conventional decorative flooring panels.

In accordance with some embodiments, both the upper and lower sections of the base layer may comprise air pockets therein. For example, both the upper and lower sections of the base layer may be foamed. In some disclosed embodiments, the size and/or distribution of the air pockets formed in the upper and lower sections of the base layer may be different, such that the average density of the upper section may be less than the average density of the lower section due at least in part to their different porosities. To that end, the upper section of the base layer may contain, on average, larger and/or more air pockets than in the lower section. Preferably, the air pockets in the lower section are sufficiently small and spaced apart that they do not create significant voids that would prevent the auditory feedback of a click-locking system built into the lower section and also maintain a sufficient structural strength and impact resistance of the base layer. In some examples, the upper section of the base layer may have a higher density than the lower section of the base layer. In other examples, the upper and lower sections may have substantially the same densities. In some examples, the density of the upper section of the base layer may be between around 700 $kg/m^3$ to around 1700 $kg/m^3$, such as at least 900 $kg/m^3$, or between 900 $kg/m^3$ to 1450 $kg/m^3$, or between 1000 $kg/m^3$ to 1450 $kg/m^3$, or between 1100 $kg/m^3$ to 1450 $kg/m^3$.

In some disclosed embodiments, the air pockets in the upper and lower sections of the base layer may be formed using foaming agents, such as mechanical or chemical foaming agents, added to a thermoplastic binder during the manufacturing process. In such embodiments, a "foamed" base layer may be created containing air pockets in both its upper and lower sections. Examples of foaming agents may include Expandex® 5-PT, AIBN (azoisobutyronitrile), ADC (azodicarbonamide), or any other suitable foaming agents. Different amounts of a foaming agent and/or different foaming agents may be added to a thermoplastic binder in each of the upper and lower sections to create different amounts of foaming in each section of the base layer. Utilizing foamed upper and lower sections in the base layer can reduce the total amount of material needed for producing decorative flooring panels, which can result in a lighter and more affordable product than was previously available in the residential flooring market.

While both the upper and lower sections of the base layer may be foamed in some embodiments, in other embodiments the upper section may be foamed while the lower section of the base layer is not. More generally, the lower section of the base layer may contain relatively fewer voids (or possibly none) compared to the upper section of the base layer, resulting in a relatively less compressible lower section that is capable of supporting a strong locking system and a relatively more compressible upper section for providing improved acoustics and/or comfort. In some embodiments, the lower section may comprise a distribution of voids formed using a non-foaming process, such as extrusion molding or one or more other processes for forming voids. In such embodiments, the voids may be formed in one or more regions of the lower section having various sizes, shapes, and/or distributions. In some disclosed embodiments, the patterned shape of the void regions in the lower section may resemble a honeycomb-like pattern. Those skilled in the art will appreciate that, in alternative embodiments, the voids in the lower section could comprise any other geometry and/or pattern. Further, in some disclosed embodiments, the lower section of the base layer may be formed without intentionally creating any voids therein.

In some disclosed embodiments of the invention, the base layer may further comprise a middle section between the upper and lower sections of the base layer. And, in some exemplary embodiments, the upper and lower sections of the base layer may be foamed, whereas the middle section may not be foamed. For example, in contrast to air pockets that may be formed by chemical or physical foaming processes in the upper and lower sections of the base layer, the middle section instead may comprise a distribution of voids formed using a different process, such as extrusion molding or one or more other processes for forming voids. In such embodiments, the voids may be formed in one or more regions of the middle section having various sizes, shapes, and/or distributions. For example, the patterned shape of the void regions of the middle section may resemble a honeycomb-like pattern. Those skilled in the art will appreciate that, in alternative embodiments, the voids in the middle section could comprise any other geometry and/or pattern.

In disclosed embodiments where the base layer comprises upper, middle, and lower sections, the upper and lower sections each may have a lower compressibility resistance as compared with the compressibility resistance of the middle section. In some embodiments, for example, the upper and lower sections may be formed having substantially the same compressibility resistance as each other but less than the compressibility resistance of the middle section; in other embodiments, the upper and lower sections may have different compressibility resistances, but again each of their compressibility resistances are lower than that of the middle section. As an example, the middle section's compressibility resistance in the base layer may be at least two times greater than the compressibility resistance in each of the upper and lower sections. An inter-panel locking system may be formed only in the less-compressible middle section of the base layer, such as by milling a tongue and groove or other click-lock system along its edges.

According to the disclosed embodiments, there may be different ways the multilayered base layer, comprising upper and lower sections, may be formed. In some embodiments, the base layer may be formed using an entirely mechanical forming process wherein the base layer's materials undergo plastic deformation and acquire their desired shape and size through application of suitable forces. Because no material is removed in certain mechanical forming processes, the base layer's materials may become recyclable from one decorative flooring panel to the next, such that one flooring panel's base layer can be displaced and deformed to create the base layer for a new second flooring panel. In some embodiments, the foamed base layer may be formed using a nitrogen, carbon dioxide, or SCF (Super Critical Fluid) foaming process to create the foamed thermoplastics used in the upper and lower sections. In some embodiments, for example, the base layer may be formed using a coextrusion process using different sources of foamed thermoplastics corresponding to the upper and lower sections. In such embodiments, the upper and lower sections may be formed together. In other embodiments, the upper and lower sections of the base layer may be fabricated separately, such as by separately extruding a foamed thermoplastic for each section. In some embodiments, the upper section may be formed of a different material, such as dioctyl terephthalate (DOTP) LVT or rubber, as compared with the material used to form the lower section of the base layer. In the exemplary embodiments having separately formed upper and lower sections of the base layer, a stand-alone upper section may be adhered or bonded to the lower section to form the base layer or, in some embodiments, the upper layer may be formed or deposited directly onto a top surface of the lower section. The lower section of the base layer may be significantly thicker than the upper section, e.g., where the thickness of the upper section is less than 30% of the base layer's total thickness. In some embodiments, for example, the thickness of the upper section may be less than 2 millimeters, such as within a range of 0.5 mm to 1 mm thick or 0.5 mm to 1.5 mm thick. In some examples, the base layer's total thickness may be between around 2 mm to around 25 mm, such as between 2.5 mm to 25 mm, or between 4 mm to 12 mm.

In certain disclosed embodiments, the upper and lower sections of the base layer may be formed of a thermoplastic composite material comprising a binder, fillers (e.g., natural or synthetic; organic or inorganic), additives, and air pockets. In some embodiments, for example, the thermoplastic binder of the base layer can be any of PE, PET, PP, PU, or PVC and, in some embodiments, may represent at least 40% per weight of the base layer. In some embodiments, carbon fibers can be added to one or both of the upper and lower sections of the base layer to improve the base layer's thermal resistance and strength. Such embodiments may include chopped carbon fibers, woven carbon fibers, nonwoven carbon fibers, or combinations thereof. The upper and lower sections of the base layer may be formed using the same thermoplastic binder material, whereby the upper and lower sections comprise separately foamed layers with different distributions and/or sizes of air pockets (and thus different densities). In other embodiments, the upper and lower sections of the base layer may be formed using different types of thermoplastic binder materials. Further, in some illustrative embodiments, the upper section of the base layer may comprise a plasticizer which represents more than 25 parts per hundred resin (phr), whereas the lower section may be virtually free of plasticizer (e.g., less than 5 phr plasticizer, less than 3 phr plasticizer, or in some embodiments no plasticizer at all). Further still, in some embodiments, a coating, wear layer, and décor layer of the top layer, and the upper and lower sections of the base layer, may be entirely free of PVC. In other embodiments, the coating, wear layer, and décor layer of the top layer, and the upper and lower sections of the base layer, may be PVC based.

Because many non-PVC thermoplastics, such as PE and PP, have chemically inert and nonporous surfaces with very low surface polarities, such materials often exhibit an undesirably low level of adhesion between the coating, wear, and décor layers of the top layer, the base layer, and the resilient soft layer underneath the base layer. In some embodiments, additives may be included in one or more of these layers to increase the inter-surface polarity of these PVC-free layers to provide sufficient inter-layer adhesion. For example, the inter-surface polarities of PVC-free layers can be improved by the inclusion of additives having relatively high polarities, such as but not limited to amines, nitro compounds, etc., which can further provide a sufficient level of inter-layer adhesion between the PVC-free coating, wear, and décor layers of the top layer, the base layer, and the resilient soft layer underneath the base layer. In addition, in certain disclosed embodiments, the surface tension of each of these various layers may be greater than or equal to 40 dyne per centimeter (dyn/cm) also to provide sufficient adhesion between the layers.

In alternative disclosed embodiments, the upper section and lower section of the foamed base layer can be flexible or rigid to varying degrees. Depending on the decorative article's application, it may be more desirable to have a more flexible foamed base layer instead of a more rigid one. The inventors have discovered several techniques to adjust the level of flexibility in the upper and lower sections of the base layer. For example, the flexibility of the upper and lower sections of the base layer may be adjusted by: (1) adding elastomers such as olefins like polyolefin, thermoplastic polyurethane, rubber, polyether polyols, etc., with different weight percentages to each of the upper and lower sections of the base layer; (2) varying the weight percentages of fillers added to the upper and lower sections of the base layer; and/or (3) modifying the densities (i.e., foamed air pocket properties) of the upper and lower sections of the base layer.

In accordance with certain disclosed embodiments, a top layer may be positioned above the base layer and comprise a soft and flexible thermoplastic material. The top layer may include some combination of a décor layer, a wear layer, and/or a coating. In some embodiments, the top layer may be PVC free, i.e., it does not comprise PVC. In some examples, the top layer may further include a scratch layer. In other examples, the coating may function as a scratch layer. In yet another example, the wear layer may be configured to provide both wear and scratch resistance. In some embodiments, the top layer may be less than or equal to 30 thousandths of an inch (mil) thick. In some examples, the décor layer and the wear layer each may have a thickness between around 0.1 mm to around 0.5 mm; in some exemplary embodiments, the combined thickness of the décor layer and the wear layer may be between around 0.1 mm to around 0.5 mm. The décor layer may comprise a layer of paper having a decorative motif printed thereon with a non-PVC substrate. In alternative embodiments, the décor layer may comprise a decorative layer of film, vinyl, rubber, or another suitable thermoplastic material that overlies the base layer in the laminated structure. In some embodiments, the décor layer may comprise a woven or non-woven material. In some embodiments, the décor layer may be adhered or bonded to the base layer. In other embodiments, the decorative layer may be printed on or over the base layer by rotogravure or direct digital print technology. For example, in some embodiments, the décor layer may be digitally printed or otherwise formed on the base layer without any sublayer between the décor layer and the base layer. In alternative embodiments, the décor layer may be digitally printed or otherwise formed on at least one sublayer positioned between the décor layer and the base layer. In some embodiments, the décor layer may be located less than 0.2 millimeters above the upper section of the base layer. In some cases, a wear layer (PVC or non-PVC) may be applied over the décor layer. In some embodiments, a protective coating may be applied over the upper surface of the top-most layer, such as on top of the wear layer. In some embodiments, the wear layer may be part of the protective coating. The protective coating may comprise a radiation (UV/EB) curing polyurethane lacquer. Similarly, one or more layers may be included underneath the base layer, such as for additional cushioning or stability. In some examples, the wear layer may be a liquid wear layer that has been cured.

In some example embodiments, the base layer may be a wood plastic composite. In some examples, the wood plastic composite may not comprise wood. Instead, the wood plastic composite layer may comprise a thermoplastic and a filler in equal or substantially equal weight percentages or such that the weight percentage of thermoplastic is greater than that of the filler. In some examples, the wood plastic composite comprises wood, thermoplastic, and one or more fillers. In other example embodiments, the base layer may be mineral layer (e.g., magnesium oxide and salt-based layer). In yet another example embodiment, the base layer may be a stone plastic composite.

The decorative articles, such as decorative flooring panels, of the disclosed embodiments may provide several acoustic benefits over conventional decorative flooring panels. For example, in some embodiments, the foamed upper and lower sections of the base layer, or more particularly the air pockets in the upper and lower sections of the base layer, may dissipate and/or absorb sound waves, thus reducing propagation of unwanted noise (such as footsteps). In addition, different types of materials in the upper and lower sections of the base layer, and different sizes and distributions of air pockets, will generally block and/or attenuate different sound frequencies (high and/or low frequencies). Because the upper and lower sections in the base layer of the disclosed embodiments may contain different sizes and/or distributions of air pockets, the upper and lower sections collectively may block a wider spectrum of sound frequencies than conventional base layers having more uniform densities and only one foamed layer or a combination of foamed and non-foamed layers. As a result, the multilayer porous base layer in the disclosed embodiments can provide improved soundproofing and noise reduction as compared with conventional decorative flooring panels.

In addition to the air pockets in the foamed upper and lower sections of the base layer, the inventors have found that the additional inclusion of holes in the decorative flooring panels further improves the acoustic performance and sound attenuation qualities of the decorative flooring panels. In some embodiments, a plurality of holes may be included in the top layer of the decorative flooring panel or other decorative article consistent with the disclosed embodiments herein. In such embodiments, the plurality of holes can further reduce the amount of sound reflected and/or transmitted by the decorative flooring panels at certain audible frequencies by dissipating sound waves that encounter the holes. In some embodiments, the holes may extend through the entire depth of the top layer, including the coating, wear layer, and décor layer. In other disclosed embodiments, the holes may only extend through only a portion of the top layer. For example, in some embodiments, the holes may be formed through the coating and wear layers. In yet other alternative embodiments, the plurality of holes may instead be formed in a portion of the base layer, for example, at least within the upper section of the base layer.

Various tools and methods may be used to create the plurality of holes in accordance with certain disclosed embodiments of the decorative articles described herein. For example, in some embodiments, these methods and tools may include the use of spiked rollers, milling, and/or mechanical needling during the forming and/or manufacturing processes to create the holes of a desired diameter, depth, and/or distribution. In other embodiments, laser ablation or other non-contact techniques may be used to form the plurality of holes. The inventors found that the number of holes and the holes' average diameters, depths, and spacing/distribution in the decorative flooring panels can have a direct correlation to the amount of sound that is permitted to pass through or reflect from the decorative articles, such as decorative flooring panels. In general, the higher the quantity of holes and the smaller their size, the better the decorative article's acoustic performance will be while maintaining its desired surface hardness. For example, in some embodiments, the holes may preferably have a diameter of between approximately 1 millimeter to approximately 5 millimeters, and the distance between the holes (inter-hole spacing) is preferably between approximately 2 millimeters to approximately 10 millimeters. The holes may be arranged in a random pattern, semi-random pattern, or in an intentional pattern (e.g., geometric). In some examples, each hole may have a circular opening (or cylindrical hole). In other examples, each hole may have a non-circular shaped opening (e.g., pentagon shape, square shape, hexagon shape, octagon shape, etc.). In other examples, adjacent holes may have different shaped openings.

The term "base layer" also may be interchangeably referred to herein as a core layer or substrate layer without departing from a broader scope of the present disclosure. It is further noted that the term "decorative article" may be interchangeably referred to as an "acoustic article" or an "acoustic decorative article" without departing from a broader scope of the present disclosure. Even though the flooring panel is referred to as a decorative article, it is noted that as described throughout this disclosure, the article is both aesthetic and functional, some of which functions are described herein.

These and other advantages of the disclosed embodiments will be apparent to those skilled in the art in light of the description above and the following detailed description and drawings directed to illustrative embodiments of the present disclosure.

BRIEF DESCRIPTION OF THE DRAWINGS

The particular features and advantages of the invention will become apparent from the following description taken in connection with the accompanying drawings in which like reference numbers indicate identical or functionally similar elements. The following figures depict details of disclosed embodiments. The invention is not limited to the precise arrangement shown in these figures, as the accompanying drawings are provided merely as examples.

DETAILED DESCRIPTION OF DISCLOSED EMBODIMENTS

Unlike conventional decorative flooring panels, the disclosed embodiments herein provide a laminated structure having a core layer having separate upper and lower sections with different compressibility resistances. The upper and lower sections of the core layer may be foamed layers having different porosities and densities (or may comprise other materials with different compressibilities) such that the upper section exhibits less compression resistance than the lower section. In some of the disclosed embodiments described herein, the core layer may comprise upper, middle, and lower sections. In such embodiments, one or more of the upper, middle, and lower sections of the core layer may be foamed layers having associated porosities and densities such that the middle section exhibits a greater compression resistance than both the upper and lower sections.

Figure 1:
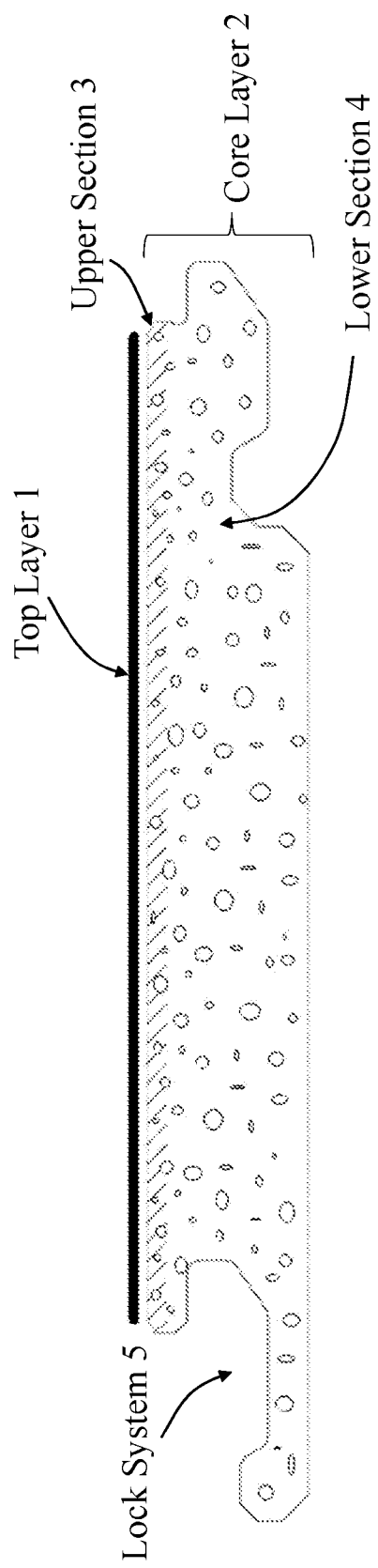
FIG. 1 is a vertical cross-section of an exemplary decorative flooring panel including a multilayered core layer having an upper section with a lower compressibility resistance than a lower section in accordance with a first exemplary embodiment of the present disclosure.

FIG. 1 shows a vertical cross-sectional view of a decorative flooring panel in accordance with a first exemplary embodiment. The panel includes a top layer 1 including a décor layer and a core layer 2 having both an upper section 3 and a lower section 4. In some embodiments, the top layer 1 may be entirely free of PVC. In other embodiments, the top layer 1 may include PVC. Further, in some embodiments, the top layer 1 may further include a wear layer and a coating over the décor layer. In FIG. 1, the upper section 3 is designated by shading using diagonal lines in an upper portion of the core layer 2. The upper section 3 may be located at or close to the top surface of the finished product (e.g., less than or equal to 30 mil away from the top surface of the top layer 1). The lower section 4 may be significantly thicker than the upper section 3 in the core layer 2. For example, in some embodiments, the upper section 3 may comprise 30% or less of the thickness of the core layer 2. Although not shown in FIG. 1, in some examples, one or more of the top layer 1 and the upper section 3 and lower section 4 of core layer 2 may further comprise a plurality of holes 7 extending fully or partially therethrough.

In some disclosed embodiments of the decorative flooring panel, the décor layer may be printed or otherwise attached or bonded directly on top of the upper section 3. Alternatively, there may be one or more sublayers (not shown) between the décor layer and the core layer 2. In some embodiments, the décor layer is located less than 0.2 millimeters above the core layer 2.

In certain disclosed embodiments, both the upper section 3 and lower section 4 do not comprise any PVC. In other embodiments, the upper and/or lower sections (3, 4) may comprise PVC without departing from a broader scope of the present disclosure. The upper section 3 and lower section 4 also may both contain air pockets therein, for example, as FIG. 1 shows in both sections of the exemplary core layer 2. The air pockets may be formed in each of these sections using one or more mechanical and/or chemical foaming agents, and in some embodiments may include nitrogen, carbon dioxide, and SCF foaming processes. In FIG. 1, the upper section 3 of the core layer 2 may contain different average sizes and/or distributions of air pockets than the lower section 4 so as to provide the upper section with a relatively lower compression resistance. The upper and lower sections of the core layer 2 may be formed together as a single layer, for example using a coextrusion process, or another type of manufacturing process in which the core-layer sections 3 and 4 may be formed together. Alternatively, the upper and lower sections of the core layer 2 may be formed independently and later adjoined, for example using a manual or automatic lamination process or adhesives.

The upper and lower sections 3 and 4 can be either rigid or flexible or semi-flexible and in some cases may be formed using the same thermoplastic binder material. In some embodiments, for example, the upper and lower sections 3 and 4 may comprise the same thermoplastic composite, such as a WPC composite, differing only in the amounts and/or types of foaming agents used. In other embodiments, one or more of the binders, fibers, additives, fillers, plasticizers, elastomers, etc. may differ in the upper and lower sections 3 and 4. For example, in some exemplary embodiments, the upper section 3 may comprise more than 25 phr of plasticizer, more than 50 phr of plasticizer, or more than 75 phr of plasticizer, while the lower section 4 may be virtually free of plasticizer (e.g., less than 5 phr). In yet other embodiments, the upper section 3 may be formed of a rubber, DOTP LVT, or other material that differs from the material used to form the lower section 4 of core layer 2.

An inter-panel locking system 5, such as a tongue and groove or other click-lock type of locking system, may be formed along the outer edges of the core layer 2. The locking system 5 is preferably formed, such as by milling, only along the edges of the lower section 4 since the lower section provides greater compression resistance, rigidity, and hardness as compared with the core layer's upper section 3. The locking system 5 may comprise any known locking or fastening mechanism that allows for interconnection with other decorative flooring panels.

Due to the lower compressibility resistance of the upper section 3 in the core layer 2, the impact acoustic performance of the decorative flooring panel may be improved (for example, resulting in less noisy footsteps). In addition, the upper and lower sections 3 and 4 may comprise air pockets that improve sound-transmission reduction of the flooring system (for example, less in-room reflected noise and noise reaching the rooms below). In some embodiments, the acoustic performance of the decorative flooring panel may be further improved by the inclusion of a plurality of holes 7 that may extend through one or more of the top layer 1 and the upper and lower sections 3 and 4 of the core layer. In some exemplary embodiments, the holes 7 may extend from the top of the decorative flooring panel to a bottom of the decorative flooring panel and may be blind holes. In some examples, the holes 7 may be through holes. In some embodiments, for example, the plurality of holes 7 may extend through the entire depth of the top layer 1, e.g., from a top surface of the top layer 1 through a bottom surface of the top layer 1, including through the coating, wear layer, and décor layer. In some examples, the holes 7 may further extend into the upper and/or lower sections (3, 4) of the core layer 2. In some examples, the top layer 1 may be free of holes 7 and the holes 7 may extend from the upper surface of the upper section 3 towards the lower section 4 of the core layer 2. In other examples, the holes 7 may extend from the top surface of the top layer 1 all the way through a bottom surface of the core layer 2 or, in some embodiments, all the way through to a bottom surface of the decorative flooring panel (e.g., which in some embodiments may include a soft resilient layer under the core layer 2).

The relatively higher compressibility resistance of the lower section 4 advantageously may prevent critical dents from penetrating into the core layer, which might otherwise damage the decorative flooring panel, and also allows for the locking system 5 to be milled directly into the lower section 4. The locking system 5 is configured to interconnect the decorative flooring panel with a similar locking system on at least one adjacent decorative flooring panel. A separate underlayment layer (not shown) may be attached or positioned below the lower section 4 of the core layer 2 to provide non-skid performance, comfort, and/or further acoustic reduction for the decorative flooring panel.

Figure 2:
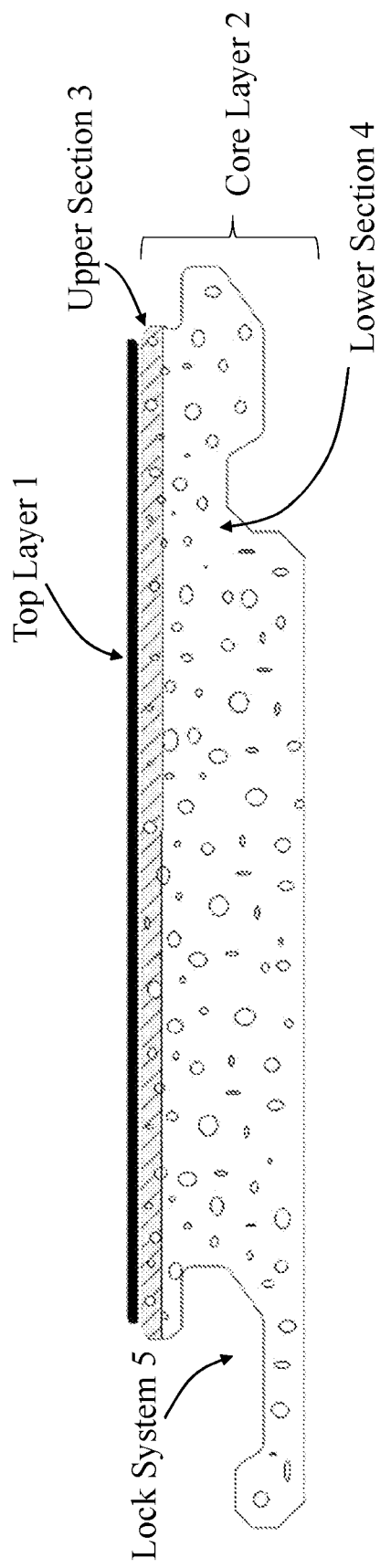
FIG. 2 is a vertical cross-section of an exemplary decorative flooring panel including a multilayered core layer having an upper section with a lower compressibility resistance than a lower section, where the upper section has been formed using a different fabrication process from the lower section, in accordance with a second exemplary embodiment of the present disclosure.

FIG. 2 shows a vertical cross-sectional view of a decorative flooring panel in accordance with a second exemplary embodiment. The difference between the exemplary embodiments of FIGS. 1 and 2 is that the upper section 3 and lower section 4 in FIG. 2 may be formed using different manufacturing processes. To illustrate this difference, the upper section 3 in FIG. 2 is further shaded (as compared with FIG. 1) to indicate that it has been formed as a separate material layer, e.g., using a different extrusion and/or calendaring process, compared to the lower section 4. In this example, the upper section 3 may be formed directly on, or may be attached to (e.g., using an adhesive or bonding, using heat and/or pressure, etc.), a top surface of the lower section 4 in the core layer 2.

In some exemplary embodiments, the upper section 3 may be primarily made of foamed plastisol, for example, with a density between 700 kg/m$^3$ and 1150 kg/m$^3$, and the lower section 4 may be primarily made of a plasticizer-free foam core with a density between 800 kg/m$^3$ and 1300 kg/m$^3$. While these two sections may have a similar density average in such exemplary embodiments, it is achieved in very different ways. For instance, the lower section 4 may be more filled but have a larger porosity than the upper section 3. In some examples, both the upper and lower sections may be PVC based but the chemical structure of the upper section is more flexible which allows the upper section 3 to compress more than the lower section 4. In some embodiments, the lower section 4 may have a large porosity which helps to improve acoustic performance, but a lack of plasticizer in the lower section makes its chemical structure more rigid and so as to reduce the compressibility. This is preferred because the lower section 4 receives the locking system 5. The inventors' research found that, for at least some of the decorative flooring panels tested, if the upper section's density is lower than 700 kg/m$^3$ or if the upper section's thickness is greater than 1.5 mm, the sound reduction might be increased but the dent resistance may not be acceptable for most flooring applications. However, a thickness of up to 2 mm of the upper section is not outside of the scope of the present disclosure for some appropriate flooring applications. Other test samples of decorative flooring panels having a construction as shown in FIG. 2 were made with an upper section 3 made of PVC resin such as used for traditional resilient rigid flooring. Compared to traditional resilient rigid flooring, the upper section 3 in these test samples had a foaming agent incorporated in the mixture before extrusion and the inventors used a very high concentration of plasticizer to make the chemical structure more flexible. The inventors found that a combination of tiny air pockets with a flexible chemical structure gives the upper section 3 a higher compressibility. In some examples, the inventors adjusted the foaming agent from 1.5 phr to 2 phr and the plasticizer amount from 40 phr to 80 phr so the upper section's compressibility rate stays in the range of 5% to 10%. In some embodiments, the compressibility rate of the upper section 3 may be between around 4% to around 20%, and in some exemplary embodiments between 5% and 8%. In some examples, the inventors kept the ratio of PVC to filler at 1:2 and density around 1.4 kg/m$^3$ which improved the dent resistance compared to samples made using plastisol topper. Such high foamed and high plasticized resin with this high amount of filler cannot be achieved with regular calendaring processes, so the inventors used an extrusion process to extrude the upper section 3.

Figure 3:
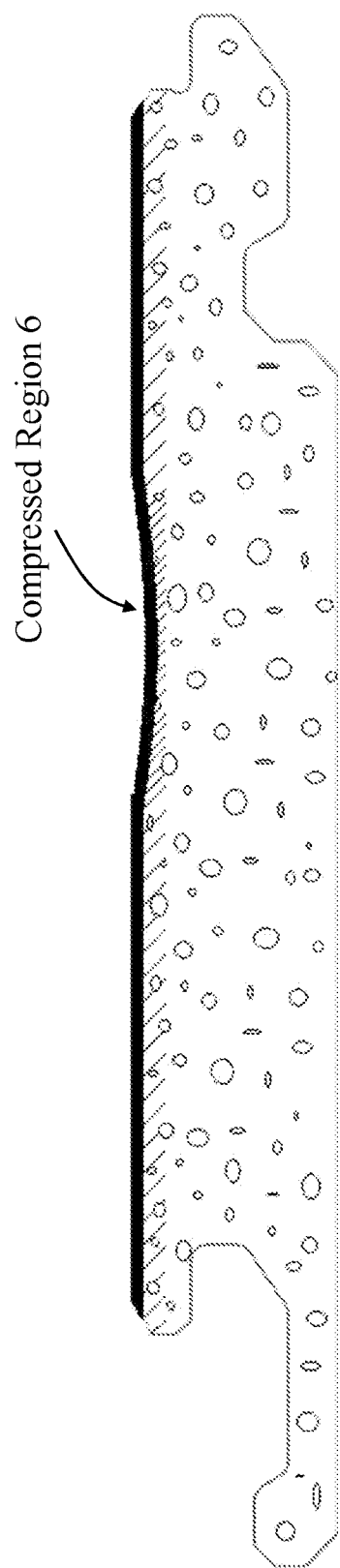
FIG. 3 is a vertical cross-section of the exemplary decorative flooring panel in FIG. 1 further illustrating an exemplary compressed region on a portion of the top layer and upper section of the core layer in accordance with the first exemplary embodiment of the present disclosure.

FIG. 3 shows the decorative flooring panel of FIG. 1 where a compressed region 6 of the top layer 1 and upper section 3 has been indented, such as from an impact on the installed decorative flooring panel (e.g., due to a dropped item) or from a heavy applied load (e.g., due to furniture), but the structural integrity of the underlying lower section 4 in the core layer 2 has not been affected due to its relatively greater compression resistance. In this case, the more compressible upper section 3 may absorb and/or dissipate the energy of the impact to help maintain the structural integrity of the underlying lower section 4 of the core layer 2. However, in this embodiment, the top layer 1 and upper section 3 may not be compressed in the region 6 under normal loads, such as from regular foot traffic, furniture, and/or home appliances, over the decorative flooring panel.

Figure 4:
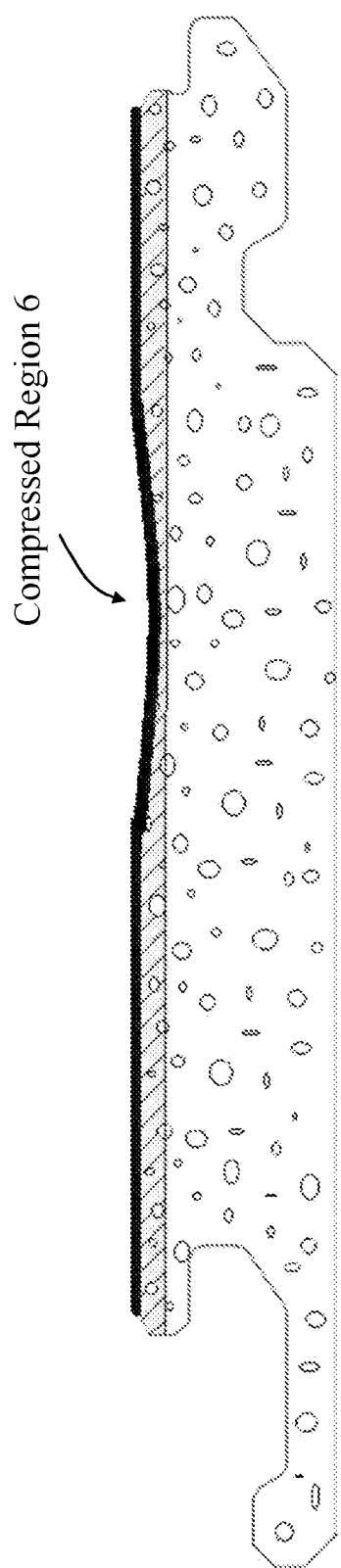
FIG. 4 is a vertical cross-section of the exemplary decorative flooring panel in FIG. 3 further illustrating an exemplary compressed region on a portion of the top layer and upper section of the core layer in accordance with the second exemplary embodiment of the present disclosure.

FIG. 4 similarly shows the decorative flooring panel of FIG. 3 including a compressed region 6 in the top layer 1 and upper section 3. Here again, the structural integrity of the lower section 4 in the core layer 2 may not affected due to its greater compression resistance as compared with the upper section 3. In addition, in this exemplary embodiment, the more compressible upper section 3 of the core layer 2 again may absorb and/or dissipate the energy of an impact or heavy load to help maintain the structural integrity of the lower section 4 in the core layer 2. In this illustrative embodiment, the top layer 1 and upper section 3 may not be compressed in the region 6 under normal loads, such as from regular foot traffic, furniture, and/or home appliances. Of course, if greater loads are applied on the surface, the lower section of the core layer will also be compressed. But the inventors found that certain combinations of upper and lower sections (3, 4) can offer suitable solutions for flooring applications. For example, in an exemplary embodiment, the upper section 3 may be a calendared foamed plastisol layer of 0.8 mm thickness that has a density of 1050 kg/m$^3$, and the lower section 4 of the core layer 2 may be a 5 mm thick extruded expanded foam PVC core with a density of 950 kg/m$^3$. In this example, the upper section 3 may have a compressibility around 7% and the lower section 4 may have a compressibility of around 3%. In some embodiments, the two sections of the core layer 2 may be laminated together using a polyurethane adhesive. This exemplary combination of upper and lower sections meets ASTM F3261 criteria (performance requirements for resilient flooring).

Figure 5:
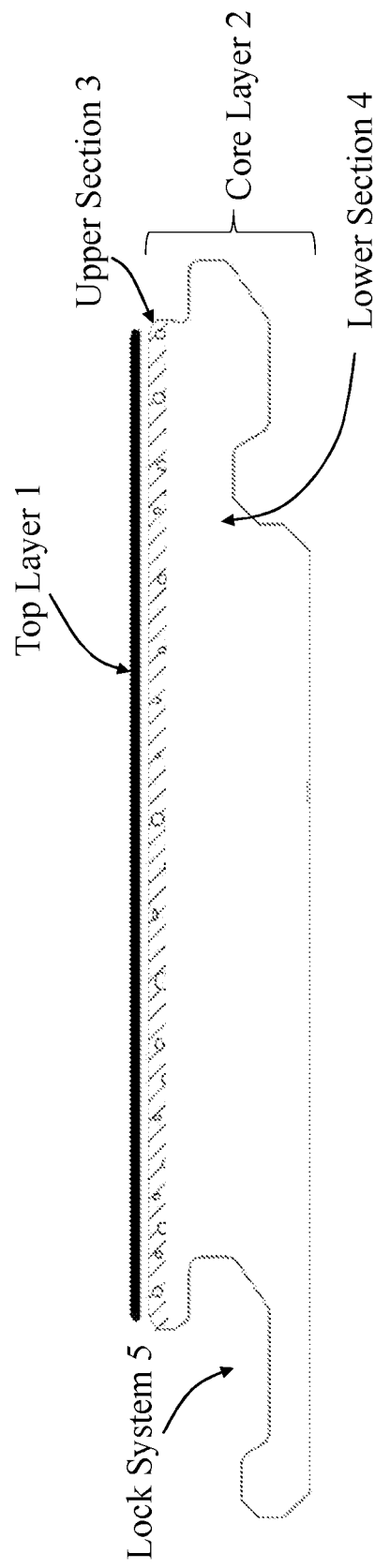
FIG. 5 is a vertical cross-section of an exemplary decorative flooring panel including a multilayered core layer having an upper section with a lower compressibility resistance than a lower section, where the upper section corresponds to a foamed region of the core layer and the lower section of the core layer is not foamed, in accordance with a third exemplary embodiment of the present disclosure.

FIG. 5 shows a vertical cross-sectional view of a decorative flooring panel in accordance with a third exemplary embodiment. The difference between the exemplary embodiments of FIGS. 1 and 5 is that the lower section 4 of the core layer 2 in FIG. 5 is not foamed and preferably contains substantially no air pockets or voids. In some cases, the compression resistance of the non-foamed lower section 4 shown in the embodiment of FIG. 5 can be further increased as compared to the compression resistance of the foamed lower section 4 in the embodiment of FIG. 1.

Figure 6:
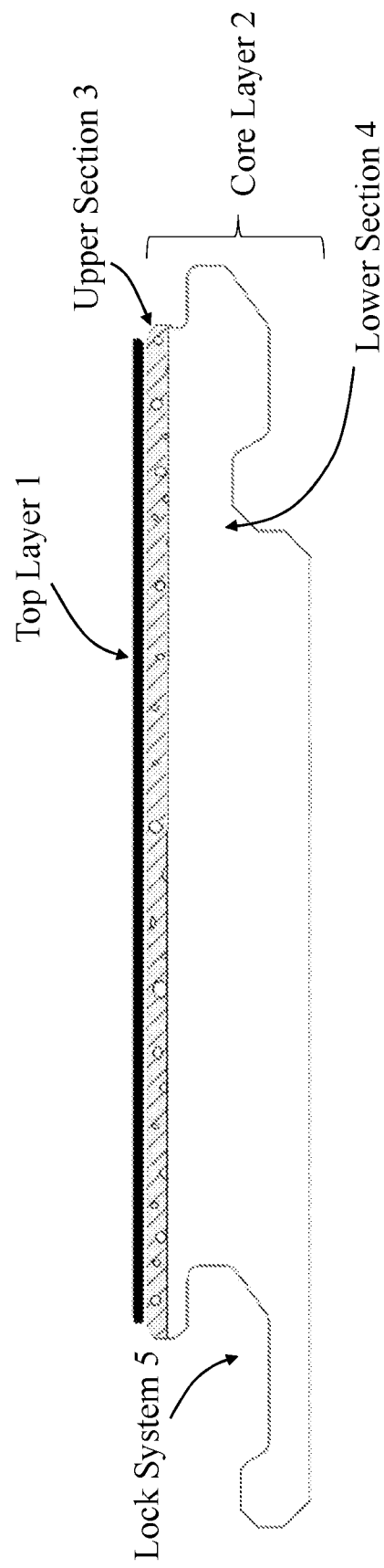
FIG. 6 is a vertical cross-section of an exemplary decorative flooring panel including a multilayered core layer having an upper section with a lower compressibility resistance than a lower section, where the upper section is foamed and the lower section is not foamed and the upper section has been formed using a different fabrication process from the lower section, in accordance with a fourth exemplary embodiment of the present disclosure.

FIG. 6 shows a vertical cross-sectional view of a decorative flooring panel in accordance with a fourth exemplary embodiment. Similar to FIG. 5 above, the difference between the exemplary embodiments shown in FIGS. 2 and 6 is that the lower section 4 of the core layer 2 in FIG. 6 is not foamed and preferably contains substantially no air pockets or voids. As noted above, the compression resistance of the non-foamed lower section 4 such as shown in the exemplary embodiment of FIG. 6 can be further increased as compared to the compression resistance of the foamed lower section 4 shown in the embodiment of FIG. 2.

Figure 7:
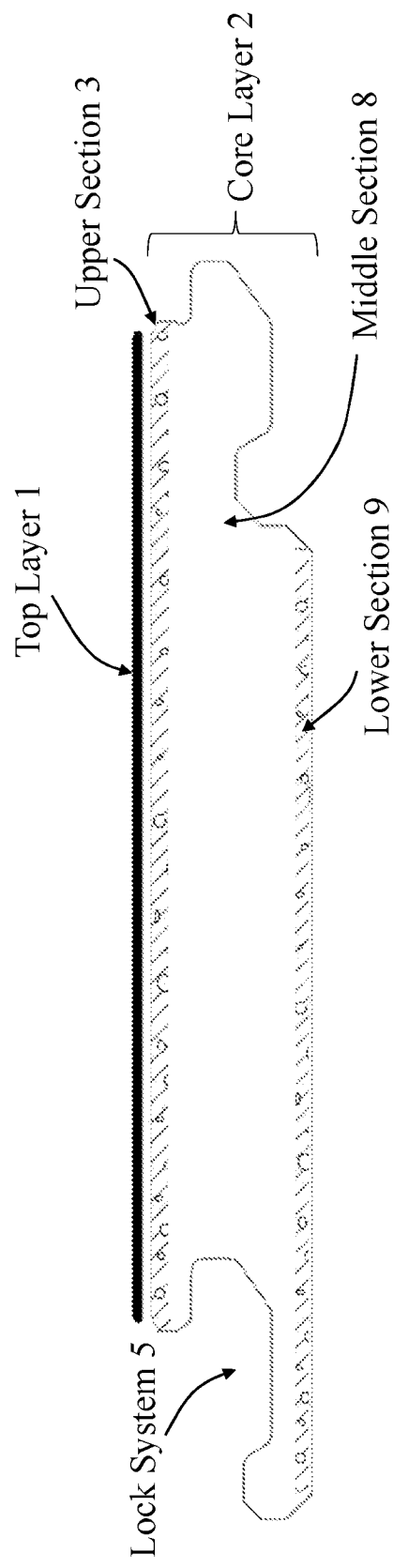
FIG. 7 is a vertical cross-section of an exemplary decorative flooring panel including a multilayered core layer having an upper section, a middle section, and a lower section, where the middle section of the core layer has a greater compressibility resistance than both the upper and lower sections, in accordance with a fifth exemplary embodiment of the present disclosure.

FIG. 7 shows a vertical cross-sectional view of a decorative flooring panel in accordance with a fifth exemplary embodiment. In this example, the core layer 2 comprises an upper section 3, a middle section 8, and a lower section 9. The upper section 3 of the core layer 2 in FIG. 7 corresponds to the same upper section 3 that may be used, for example, in the exemplary embodiments of FIGS. 1 and 5. The upper section 3 alternatively could be a separate layer that is adhered or bonded to the top of the middle section 8, such as the upper section 3 that is adhered or bonded to the upper section 4 in the embodiments of FIGS. 2 and 6.

The middle section 8 corresponds to the previously-described lower section 4. In the example shown in FIG. 7, the middle section 8 is not foamed and therefore may correspond to the lower section 4 shown in the embodiments of FIGS. 5 and 6. In alternative embodiments (not shown), the middle section 8 may be foamed and contain air pockets, such as the lower section 4 in the exemplary embodiments of FIGS. 1 and 2. A locking system 5 may be formed along the outer edges of the middle section 8 in the same way that the locking system 5 is formed along the outer edges of the lower section 4 in each of the other exemplary embodiments in FIGS. 1-6.

In FIG. 7, the core layer 2 further comprises a lower section 9. The lower section 9 may provide further acoustic improvements in reducing noise and providing comfort when users walk on the decorative flooring panel. In some embodiments, the lower section 9 may be formed in the same way as the upper section 3. As FIG. 7 shows, for example, the lower section 9 may be a foamed layer that is located at or close to the bottom of the core layer 2. In other embodiments, the lower section 9 may be formed of a different material than the upper section 3 and, in some embodiments, may be a separately formed material layer that is adhered or bonded to the bottom of the middle section 8. Like the decorative flooring panels shown in FIGS. 1-6, the decorative flooring panel in FIG. 7 also may further include a separate underlayment layer (not shown) that can be attached or otherwise positioned below the lower section of the core layer 2 to provide non-skid performance, comfort, and/or further acoustic reduction for the decorative flooring panel. In some examples, the foaming, density, thickness, and/or material composition of the upper section 3 and the lower section 9 may be different from each other and also from the middle section 8. In other examples, the foaming, density, thickness, and/or material composition of the upper section 3 and the lower section 9 may be similar to each other but may differ from the middle section 8.

Figure 8:
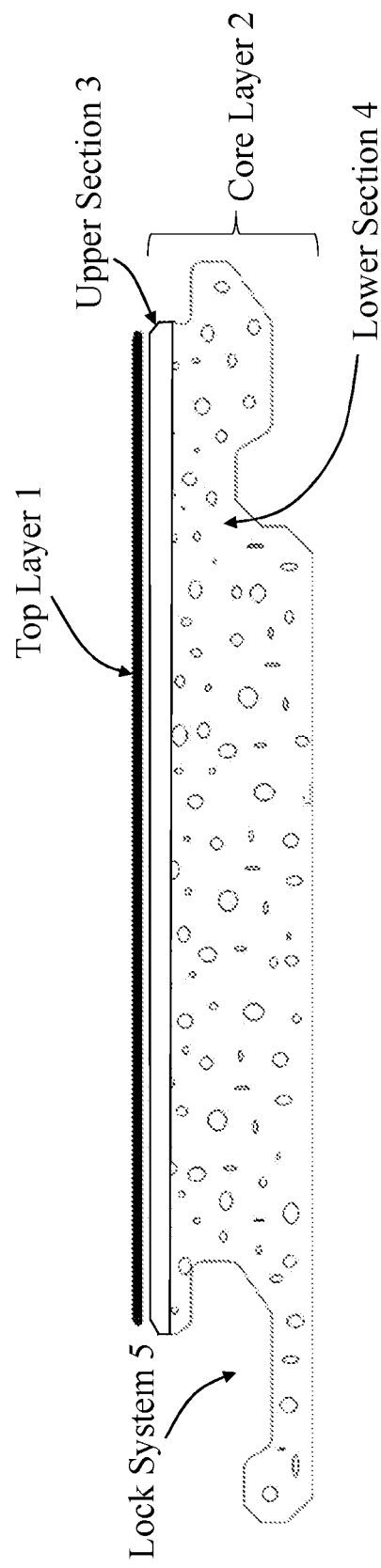
FIG. 8 is a vertical cross-section of an exemplary decorative flooring panel including a multilayered core layer having an upper section with a lower compressibility resistance than a lower section, where the upper section is not foamed and the lower section is foamed, in accordance with a sixth exemplary embodiment of the present disclosure.

FIG. 8 shows a vertical cross-sectional view of a decorative flooring panel in accordance with a sixth exemplary embodiment. Similar to FIGS. 1 and 2 above, the core layer 2 comprises an upper section 3 and a lower section 4. However, in this exemplary embodiment, the upper section 3 of the core layer 2 in FIG. 8 is not foamed and preferably contains substantially no air pockets or voids, although the lower section 4 does comprise air pockets or voids. In said embodiment (such as in FIG. 8), to create an upper section 3 having a lower compressibility resistance or higher compressibility rate than the lower section 4, the plasticizer content of the upper section 3 may be increased up to 80 phr. Because a higher plasticizer rate can increase the overall production cost, the inventors found they could limit the thickness of the upper section to around 0.9 mm and still reduce the level of footstep sounds while remaining in an acceptable cost range for a viable product. In the exemplary embodiment of FIG. 8, the upper section 3 does not have air pockets (or substantially none compared to lower section 4) in order to prioritize its impact resistance over its sound performance (and while still achieving an acceptable sound performance), since high impact resistance can be relatively more important for some commercial applications.

Figure 9:
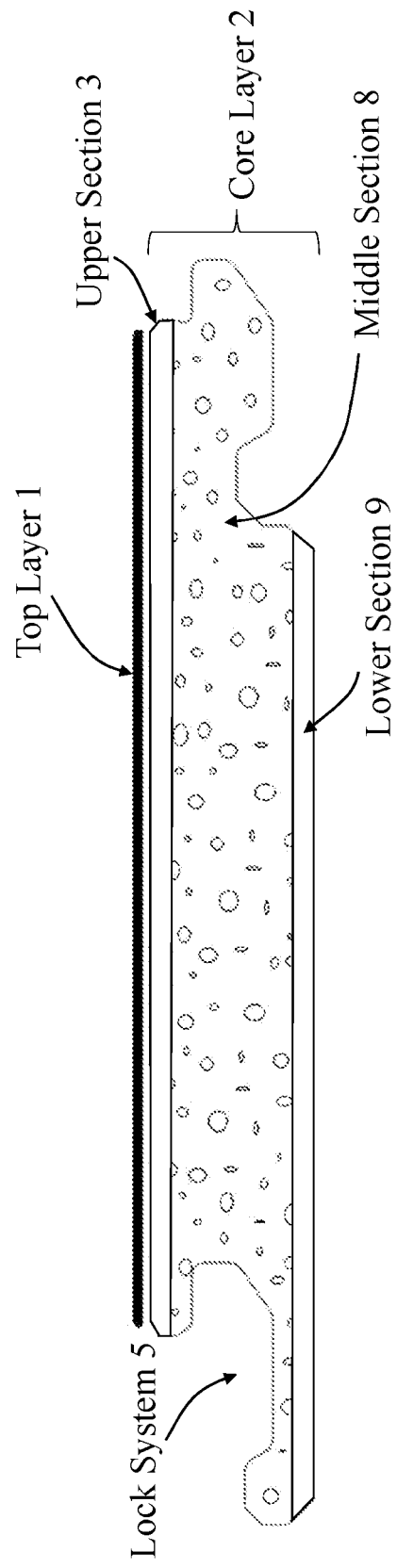
FIG. 9 is a vertical cross-section of an exemplary decorative flooring panel including a multilayered core layer having an upper section, a middle section, and a lower section, where the middle section of the core layer has a greater compressibility resistance than both the upper and lower sections, and where the upper and lower sections are not foamed and the middle section is foamed, in accordance with a seventh exemplary embodiment of the present disclosure.

FIG. 9 shows a vertical cross-sectional view of a decorative flooring panel in accordance with a seventh exemplary embodiment. Similar to FIG. 7, the core layer 2 in FIG. 9 also comprises an upper section 3, a middle section 8, and a lower section 9. However, in this example, the upper section 3 and lower section 9 preferably contain substantially no air pockets or voids and may be formed using similar materials as the upper section 3 described above in the exemplary embodiment of FIG. 8. The middle section 8 in FIG. 9 may contain air pockets and may be formed using the same material, such as comprising a foamed thermoplastic, as the lower section 4 described above in connection with the exemplary embodiment of FIG. 8. In some embodiments, the upper section 3 in FIGS. 8 and 9 and the lower section 9 in FIG. 9 may be formed using an extrusion process. Alternatively, these exemplary sections 3 and 9 of the core layer 2 could be formed as separate layers that are adhered or bonded to the upper section 4 (FIG. 8) or middle section 8 (FIG. 9). The decorative flooring panels in FIGS. 8 and 9 also may further include a separate underlayment layer (not shown) that can be attached or otherwise positioned below the lower section of the core layer 2.

In some exemplary embodiments in which the core layer 2 includes an upper section 3, middle section 8, and lower section 9, such as shown in FIGS. 7 and 9, the lower section 9 may be formed of the same or similar material and/or the same or similar thickness as the upper section 3 to help to keep the construction balanced for thin decorative flooring panels. Thicker decorative flooring panels, however, may not include the lower section 9, for example, such as shown in the exemplary embodiments of FIGS. 1-6 and 8.

Figure 10:
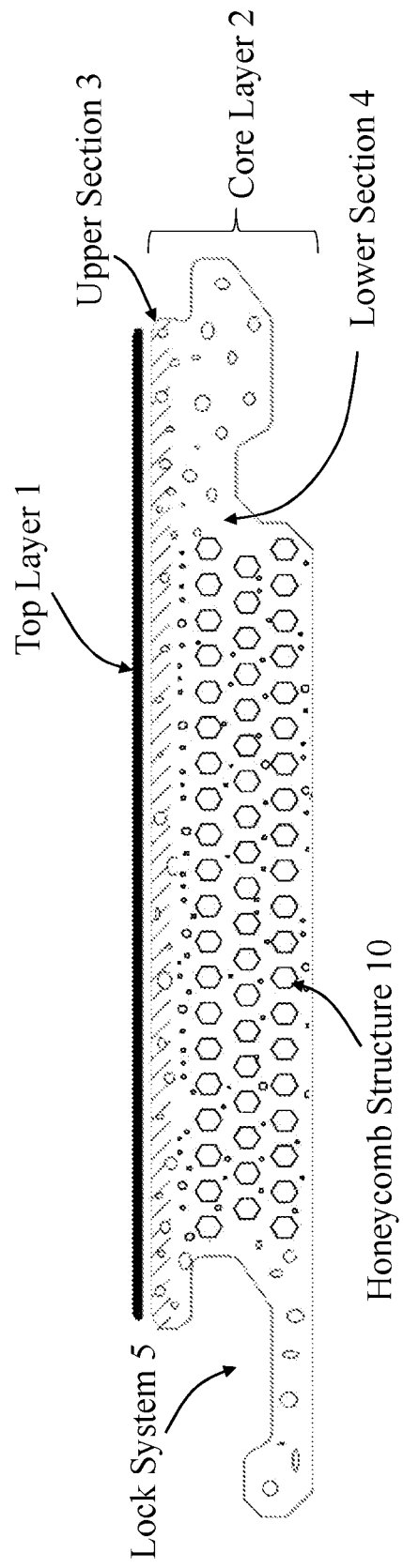
FIG. 10 is a vertical cross-section of an exemplary decorative flooring panel including a multilayered core layer having an upper section with a lower compressibility resistance than a lower section, where the lower section of the core layer comprises a honeycomb-like structure, in accordance with an eighth exemplary embodiment of the present disclosure.

FIG. 10 shows a vertical cross-sectional view of a decorative flooring panel in accordance with an eighth exemplary embodiment. The difference between the exemplary embodiments of FIGS. 1 and 10 is that the lower section 4 of the core layer 2 in FIG. 10 further contains a honeycomb-like pattern 10 of voids. While the voids may be hexagonal, as the embodiment of FIG. 10 shows, they alternatively may comprise a generally regular (i.e., substantially periodic) pattern of air pockets having any shapes and sizes. For example, the honeycomb-like pattern could comprise a generally regular pattern of circular bubbles or other polygonal shapes. The honeycomb-like pattern 10 preferably fills a majority of the volume of the relatively less compressible section of the core layer 2, such as the lower section 4 (FIGS. 1-6) or middle section 8 (FIG. 7). Thus, the honeycomb-like pattern 10 need not fill the entire volume, although it could. The honeycomb-like pattern 10 may be used in a lower section 4 or middle section 8 with or without foaming. In some embodiments, the honeycomb-like pattern 10 may be used to provide improved structural strength and/or compression resistance to the lower section 4 or middle section 8 with the added advantage of using less material in the core layer 2. In some examples the honeycomb patterned voids 10 may extend horizontally (e.g., from one edge to the other or from side to side and not from top surface to bottom surface of core layer 2) along at least a portion of the width or length of the core layer 2.

Figure 11:
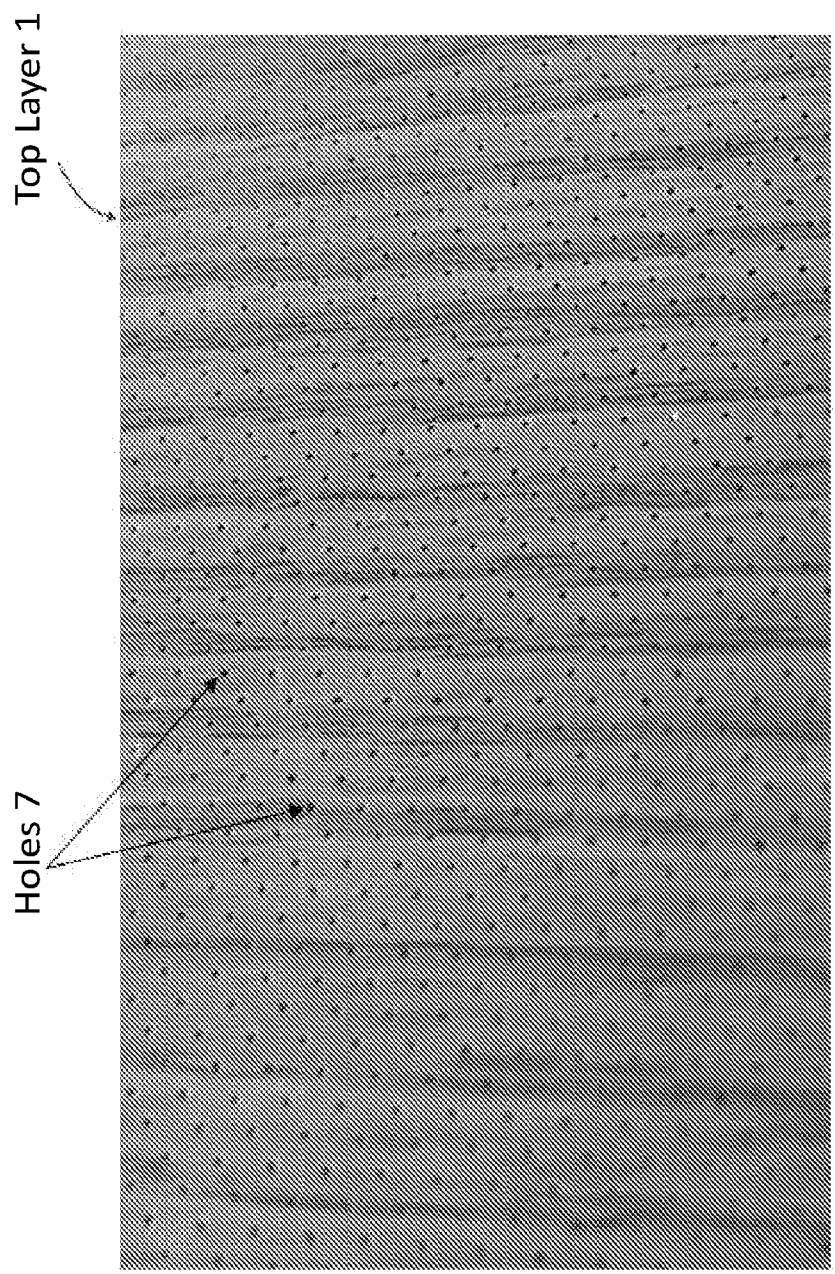
FIG. 11 is a top view of an exemplary decorative flooring panel comprising a plurality of holes formed on at least its top, outermost surface in accordance with another exemplary embodiment of the present disclosure which may be used alone or in conjunction with any of the various disclosed embodiments of a multilayered core layer described herein.

FIG. 11 shows a top view of an exemplary decorative flooring panel having a plurality of holes 7 formed in the top layer 1. In this example, the depth of the holes 7 may substantially coincide with the full depth of the top layer 1. However, in other disclosed embodiments, the plurality of holes 7 may extend more or less deep into the top layer 1 and, for example, may be formed in one or more of the top layer 1 and the upper and lower sections 3 and 4 of the core layer 2. For example, in alternative embodiments, the holes 7 may extend only partially through the top layer 1; in yet other embodiments, the holes may extend through the top layer 1 and into at least a portion of the upper section 3 of the core layer 2. When the holes 7 are used in conjunction with some embodiments comprising a honeycomb-like structure of voids 10 in core layer 2, such as FIG. 10 shows, the voids 10 in the honeycomb-like structure may have openings that are larger (at least on average) than the size of the openings of the holes 7. In other examples, the size of the openings of the voids 10 in the core layer 2 may be around the same size as the openings of the holes 7. In this context, the relative size of the openings of the voids 10 and the holes 7 may correspond to their relative average or approximate diameters or cross-sectional areas.

Unlike conventional flooring panels, the disclosed embodiments provide decorative flooring panels that can improve acoustic performance of the flooring panels while also maintaining sufficient top surface hardness. In this regard, the inventors generally found that the inclusion of a large quantity of small holes 7 in a decorative flooring panel provides superior noise performance and acoustic dampening compared to the inclusion of a smaller quantity of larger holes, all other factors being equal. For example, in certain preferred embodiments, the holes 7 may optimally have a diameter of between about 1 millimeter to about 5 millimeters and the distance between the holes is preferably between about 2 millimeters to about 10 millimeters.

The foregoing description has been directed to specific exemplary disclosed embodiments of the present invention. It will be apparent, however, that other variations and modifications may be made to the described embodiments, with the attainment of some or all of their advantages. For example, the decorative article described herein is described in the context of a decorative flooring panel, but more generally it may be a wall, floor, or ceiling covering. Further, as used herein, the terms "around," "about," "approximately," or "substantially" used in connection with a value allows for a variation of plus or minus 5 percent, or plus or minus 10 percent, or plus or minus 20 percent of that value (including the value itself). In addition, a range of values disclosed herein, such as a range "between" two values, is generally inclusive of the end points of the range.

Accordingly, this description is to be taken only by way of example and not to otherwise limit the scope of the embodiments herein. Therefore, it is the object of the appended claims to cover all such variations and modifications as come within the true spirit and scope of the embodiments herein.

We claim:

1. A decorative article comprising:
   a top layer comprising a décor layer and a wear layer; and
   a core layer comprising an upper section and a lower section, the upper section having a lower compressibility resistance than the lower section and the upper section having a density of at least 900 kg/m$^3$,
   wherein the top layer is positioned above the upper section of the core layer and the upper section of the core layer is positioned above the lower section of the core layer, and
   wherein the lower section of the core layer comprises a locking system configured to interconnect with at least one adjacent decorative article.

2. The decorative article of claim 1, wherein the decorative article is a decorative flooring panel.

3. The decorative article of claim 1, wherein the upper section of the core layer comprises a foamed thermoplastic material.

4. The decorative article of claim 3, wherein both the upper and lower sections of the core layer comprise foamed thermoplastic materials.

5. The decorative article of claim 3, wherein the lower section of the core layer comprises less than 3 phr of plasticizer.

6. The decorative article of claim 5, wherein the lower section of the core layer comprises no plasticizer at all.

7. The decorative article of claim 1, wherein the upper section of the core layer comprises at least 50 phr of plasticizer.

8. The decorative article of claim 7, wherein the upper section of the core layer comprises at least 75 phr of plasticizer.

9. The decorative article of claim 1, wherein the upper section of the core layer is a separate material layer attached to a top surface of the lower section of the core layer.

10. The decorative article of claim 1, wherein the ratio of upper section compressibility to lower section compressibility is at least 1.5.

11. The decorative article of claim 1, wherein a compressibility rate of the upper section is between around 4% to around 20%.

12. The decorative article of claim 11, wherein the compressibility rate of the upper section is between 5% and 8%.

13. The decorative article of claim 1, wherein a thickness of the upper section is less than 2 millimeters.

14. The decorative article of claim 13, wherein the thickness of the upper section is in the range of 0.5 millimeters and 1.0 millimeter.

15. The decorative article of claim 1, wherein the décor layer is located less than 0.2 millimeters above the upper section of the core layer.

16. The decorative article of claim 1, wherein the locking system is formed along outer edges of the lower section of the core layer.

17. The decorative article of claim 16, wherein the locking system is a click-lock type of locking system.

18. The decorative article of claim 1, further comprising a resilient soft layer underneath the core layer.

\* \* \* \* \*